April 25, 1933.  S. E. B. SODERBERG  1,905,519
REGULATOR
Filed Sept. 22, 1931  3 Sheets-Sheet 1
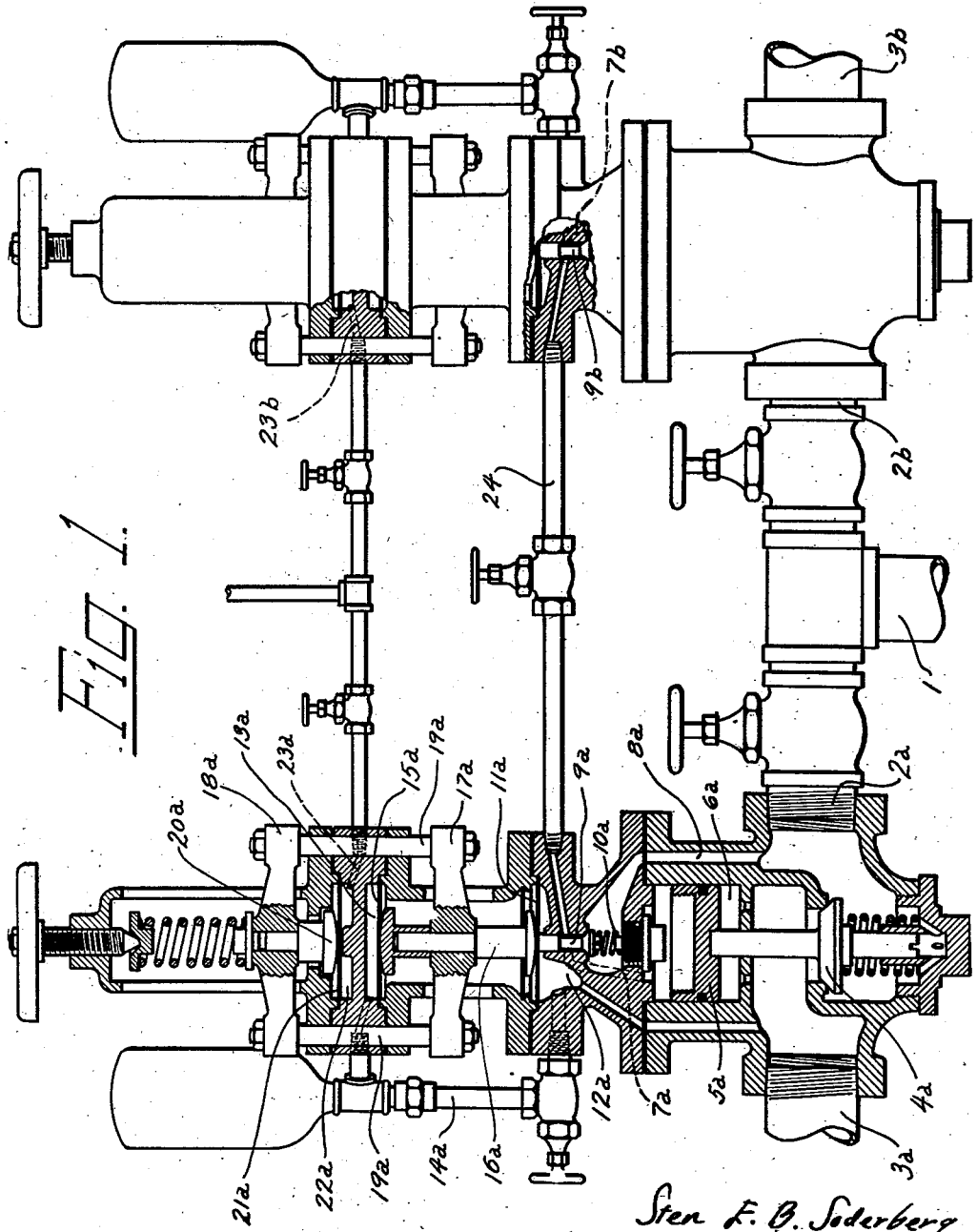
Sten E. B. Soderberg
INVENTOR
BY O. I. Thiele
ATTORNEY

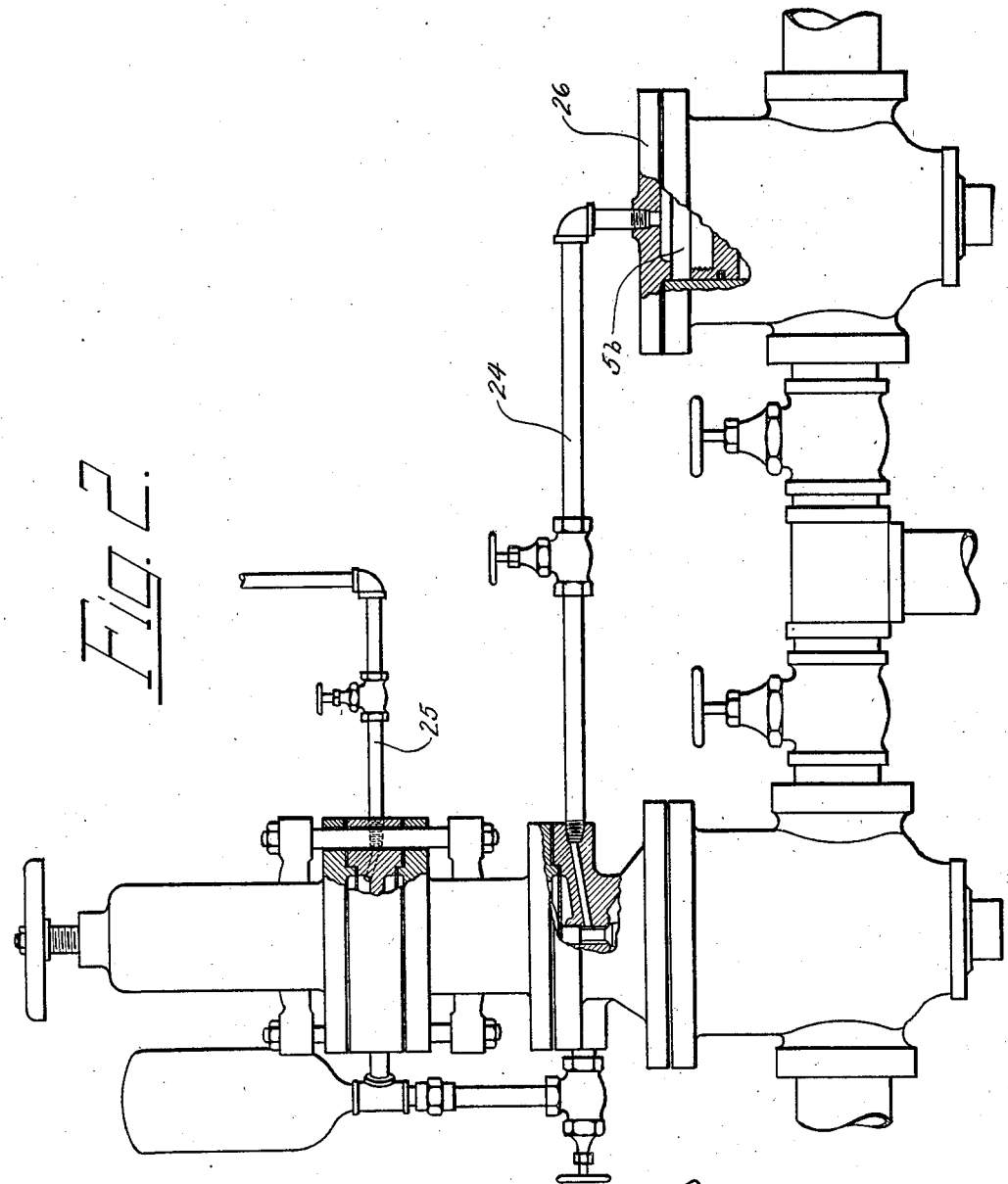

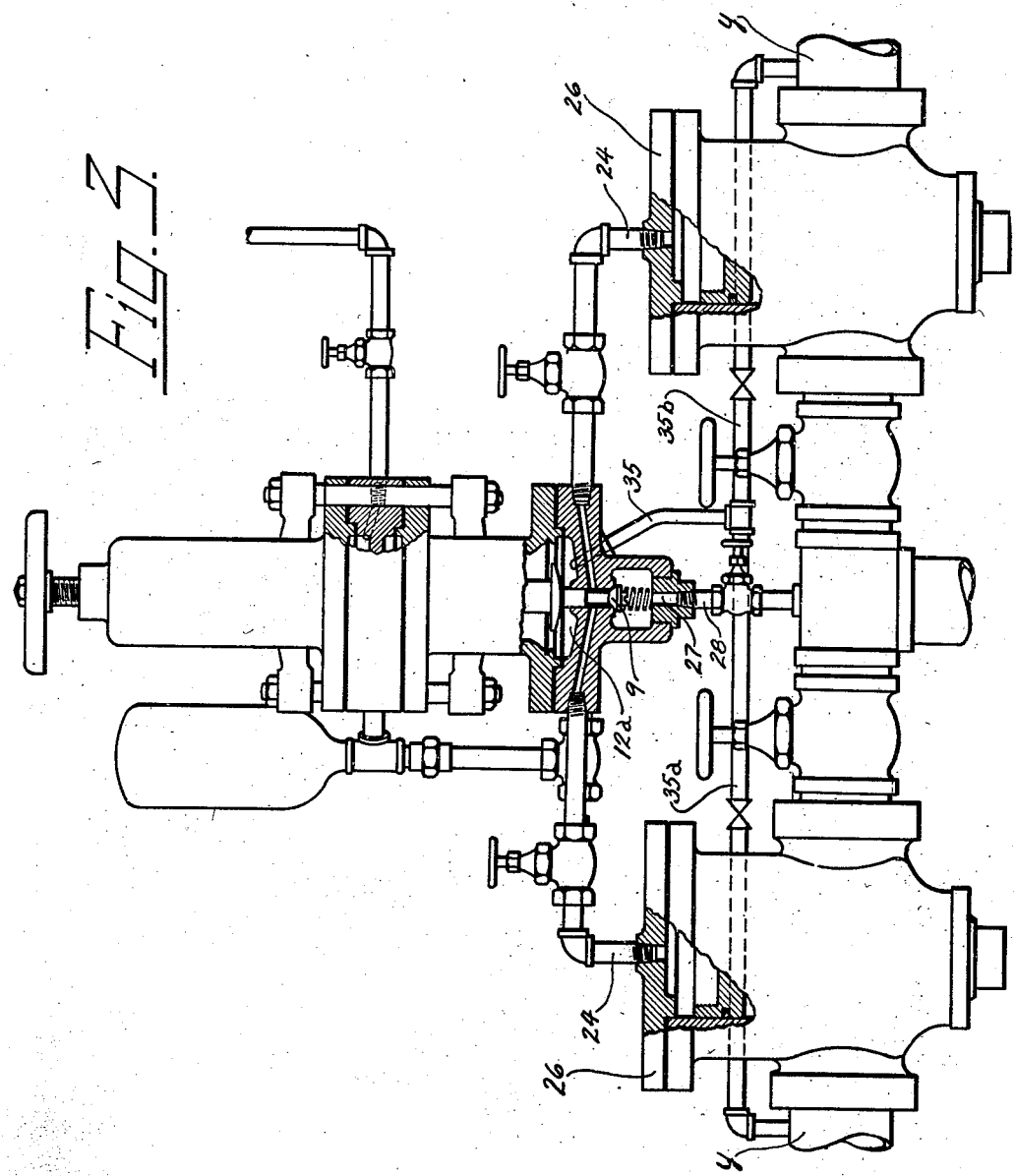

Patented Apr. 25, 1933

1,905,519

UNITED STATES PATENT OFFICE

STEN E. B. SODERBERG, OF PASSAIC, NEW JERSEY, ASSIGNOR TO LESLIE COMPANY, OF LYNDHURST, NEW JERSEY

REGULATOR

Application filed September 22, 1931. Serial No. 564,316.

This invention relates to pressure regulators, particularly when used for regulating pressure in steam lines for pumps. More particularly, the invention refers to regulators such as disclosed and claimed in my U. S. Patent 1,745,917. In this type of regulator the steam pressure in the pipe leading to the pump is controlled not only in the ordinary way tending to keep it constant, but in addition, in response to the pressure prevailing in the delivery line of the pump. If the pressure in the pump delivery increases, the regulator automatically tends to decrease the pressure in the steam line to the pump, and vice versa, when the pump delivery pressure decreases, the regulator tends to increase the steam pressure.

The particular form of the regulator disclosed in said patent includes a further feature which is intended to prevent "hunting" of the regulator. In describing the present invention I shall show it as applied to the regulator of the precise form of the former patent, although, as will be clear from the ensuing description, this may vary in some respects while still retaining the important features of the present invention.

The invention is illustrated in the accompanying drawings in which Fig. 1 shows two regulators combined in an arrangement according to my invention; Fig. 2 shows a simplified arrangement according to my invention, and Fig. 3 shows a further modification.

Referring first to Fig. 1, there are shown two regulating devices designated by the letters A and B respectively. This is for illustrative purposes only as there may be more than two regulators, their number depending upon the number of pumps used. The steam comes from the boiler through pipe 1 and enters the regulator A at 2a and leaves at 3a to flow to the first of the two pumps. The steam inlet to the regulator B is at 2b and the outlet at 3b. The two regulators are identical in construction this construction being that of the patent referred to above, and it will suffice to give a brief description of one of them.

The flow from 2a to 3a is controlled by the spring loaded valve 4a whose position is determined by that of piston 5a. This piston reciprocates in the cylindrical cavity 6a. The lower end of this cavity is in open communication with the outlet side 3a of the regulator, whereas the upper end of the cavity is in communication by means of the passages 7a and 8a with the inlet 2a. The communication between 7a and 8a is controlled by the valve 9a. This valve is urged upward by a spring 10a, and its upper extension abuts against the diaphragm 11a. The space 12a below the diaphragm 11a is in communication with an upper space 13a by means of a connection 14a. The space 13a is closed below by the diaphragm 15a. A rigid member 16a extends from one diaphragm to the other. This rigid member carries a yoke 17a connected to a second upper yoke 18a by the members 19a—19a. The upper yoke 18a carries a member 20a bearing against a diaphragm 21a. This diaphragm forms the upper side of a cavity 22a in communication by means of the inlet 23a with the pump delivery.

Without going into any great detail on the action of this device, which it may be assumed is understood by those versed in this art, and is fully described in my said former patent, it will be sufficient to say that the position of the valve 9a depends, among other things, on the relative inlet and outlet steam pressures as well as on the delivery pressure from the pump.

In practice, the necessity has arisen at times of using two or more pumps to supply fluid under pressure to the same chamber. A regulator for each pump has in such cases been used but it has been found impossible to get satisfactory results from such an arrangement because one pump or another would take more than its share of the load, and even with the finest adjustment possible of the regulators, it has not been feasible to distribute the loads accurately among the several pumps. If the regulators are not properly synchronized, one of them may cause its associated pump to bring up the discharge pressure to a point where the other regulator will shut down its pump, with the result that the first pump will work at excessive speed with the other one only turning over. In cases where check valves are installed in the discharge line from each pump it is impossible to keep the pressure from each pump so uniform that all the check valves remain open. One of the pumps will respond more quickly than the others and the check valves of the latter will slam shut. Then when one of the other pumps picks up it may carry the pressure beyond that of the first pump before its check valve opens. The check valve will then fly open suddenly and the check valve of the first pump will shut with a shock.

It is in other words impossible to keep the pressure from the several pumps so balanced as to give stable operation. There will be wide fluctuations and shocks in discharge pressure resulting in poor operation and low efficiency of the pumps.

It is the purpose of my invention to obviate these difficulties.

In Fig. 1 a pipe 24 is shown connecting the passage 7a of regulator A with the corresponding passage 7b of the regulator B. The exact points connected, as shown in the drawing, are points in the annular space surrounding the stem of valves 9a and 9b.

A pipe 25 connects the two inlets 23a and 23b, this pipe in turn being connected to the discharge from the pump.

By these means it is found that an exact distribution of the load between the two pumps is obtained. If for example one of the regulators responds more quickly than another and opens its pilot valve 9a further than the pilot valve 9b of the other regulator, then the steam pressure admitted by pilot 9a will be equally distributed through pipe 24 to the tops of pistons 5a and 5b of the two regulators. If pilot valve 9a should shut off more than 9b, tending to reduce the pressure on top of piston 5a below that on top of 5b, these two pressures will at once be equalized through pipe 24. In other words, the steam pressure on top of the two pistons 5a and 5b, which determines the position of the regulating valves 4a and 4b respectively, will always be equal, regardless of the relative positions of the two pilot valves.

Inasmuch as the steam pressures, the piston areas, and the springs tending to close the two regulating valves 4a and 4b are equal, the two valves will always open or close the same amount for a given variation in the discharge pressure, thereby equalizing the steam distribution to the pumps.

According to the form of my invention illustrated in Fig. 2 I omit the upper portion of one of the regulators, that is, everything above the cylindrical chamber 5b and close this chamber by a cover 26 connecting the upper part of the chamber 5b to the pipe 24. The connection to the pump discharge extends by the pipe 25 to the remaining regulator inlet.

It will be seen that by these simplified means the same regulation can be obtained as by the form first described.

Instead of placing the upper part of the regulator on one of the lower portions they can both be closed off by covers 26—26, as in Fig. 3, and the upper portion of the regulator be placed separately from either of them, the connections 24—24 being made to the two covers 26—26.

The lower portion of the upper part of the device can in that case be somewhat modified, the chamber for the valve 9 having a central outlet 27 connected by pipe 28 directly to the steam supply. The space 12a is connected to the two pipes y—y by means of the pipe 35 and its two valved branches 35a and 35b. The action of the third form of the device is of course identical with that of the second form and will be obvious.

What I claim is:

1. In apparatus of the class described, the combination of a plurality of pump regulators, each adapted to regulate the respective supply of actuating pressure fluid to one of a plurality of pumps discharging into the same main, each of said regulators comprising a valve controlling the supply of pressure fluid to a pump and a movable member actuating the valve, the position of the member being responsive to fluid pressure in a space adjacent to it, and a conduit placing the fluid pressure spaces into communication with each other.

2. Apparatus in accordance with claim 1, each regulator further including a pilot valve controlling the admission of pressure fluid to said space, and means responsive to the pressure of the pressure fluid leaving the regulator influencing the position of the pilot valve.

3. Apparatus in accordance with claim 1, each regulator further including a pilot valve controlling the admission of pressure fluid to said space, and means responsive to the pressure of the pressure fluid leaving the regulator and to the pressure of the pump discharge influencing the position of the pilot valve.

4. Apparatus in accordance with claim 1, each regulator further including a pilot valve controlling the admission of pressure fluid to said space, and two diaphragm chambers whose diaphragms influence the position of the pilot valve, one of these diaphragm chambers being subject to the pressure of the pressure fluid leaving the regulator and the other to the pressure of the pump discharge, the latter chambers of the several regulators being interconnected.

5. Apparatus in accordance with claim 1, and further including a pilot valve controlling the admission of pressure fluid to said spaces, and means responsive to the pump discharge influencing the position of the pilot valve.

STEN E. B. SODERBERG.